United States Patent
Ellebro et al.

(10) Patent No.: US 9,718,099 B2
(45) Date of Patent: Aug. 1, 2017

(54) VIBRATION DAMPER FOR REDUCING VIBRATIONS OF A LOW FREQUENCY SOUND GENERATOR

(71) Applicant: Infrafone AB, Sundbyberg (SE)

(72) Inventors: Martin Ellebro, Skogstorp (SE); Mats Olsson, Lidingö (SE)

( * ) Notice: Subject to any disclaimer, the term of this patent is extended or adjusted under 35 U.S.C. 154(b) by 115 days.

(21) Appl. No.: 14/781,048

(22) PCT Filed: Mar. 27, 2014

(86) PCT No.: PCT/SE2014/050375
§ 371 (c)(1),
(2) Date: Sep. 29, 2015

(87) PCT Pub. No.: WO2014/163556
PCT Pub. Date: Oct. 9, 2014

(65) Prior Publication Data
US 2016/0052021 A1    Feb. 25, 2016

(30) Foreign Application Priority Data

Apr. 4, 2013   (SE) ........................ 1330033

(51) Int. Cl.
| | | |
|---|---|---|
| B06B 1/20 | (2006.01) | |
| B06B 1/18 | (2006.01) | |
| G10K 11/04 | (2006.01) | |
| F16F 15/02 | (2006.01) | |
| F28G 7/00 | (2006.01) | |

(52) U.S. Cl.
CPC .............. B06B 1/20 (2013.01); B06B 1/18 (2013.01); F16F 15/02 (2013.01); F28G 7/00 (2013.01); G10K 11/04 (2013.01)

(58) Field of Classification Search
CPC ... B06B 1/18; B06B 1/20; F16F 15/02; F28G 7/00; G10K 11/00; G10K 11/002; G10K 11/04; G10K 11/16; G10K 11/161
USPC ............ 116/37 R, 138, 139, 142 FP, 142 FV
See application file for complete search history.

(56) References Cited

U.S. PATENT DOCUMENTS

| | | | |
|---|---|---|---|
| 4,113,048 A * | 9/1978 | Teodorescu ............... | F01N 1/10 |
| | | | 181/220 |
| 5,005,511 A * | 4/1991 | Olsson ..................... | B06B 1/20 |
| | | | 116/137 R |
| 2009/0229068 A1* | 9/2009 | Henderson et al. .. | B08B 7/0007 |
| | | | 15/316.1 |

FOREIGN PATENT DOCUMENTS

| | | | | |
|---|---|---|---|---|
| WO | WO 0206698 A1 * | 1/2002 | ............ | F04B 35/045 |
| WO | WO 2012069702 A1 * | 5/2012 | ............... | B08B 7/02 |
| WO | WO 2012140590 A2 * | 10/2012 | ........... | E04B 1/8218 |
| WO | WO 2014163556 A1 * | 10/2014 | ............... | B06B 1/18 |

* cited by examiner

Primary Examiner — R. A. Smith

(57) ABSTRACT

The invention relates to a vibration damper (1) configured to be provided on a low frequency sound generator, which comprises a feeder unit (2) with a positive feedback system regulated by a reciprocating spring loaded piston (3) and a resonator tube (4). The vibration damper (1) may be positioned outside the resonator tube (4). The vibration damper (1) comprises a first flange (5) connected to the resonator tube (4), a number of springs (6), a second flange (7) and a number of weights (8).

10 Claims, 1 Drawing Sheet

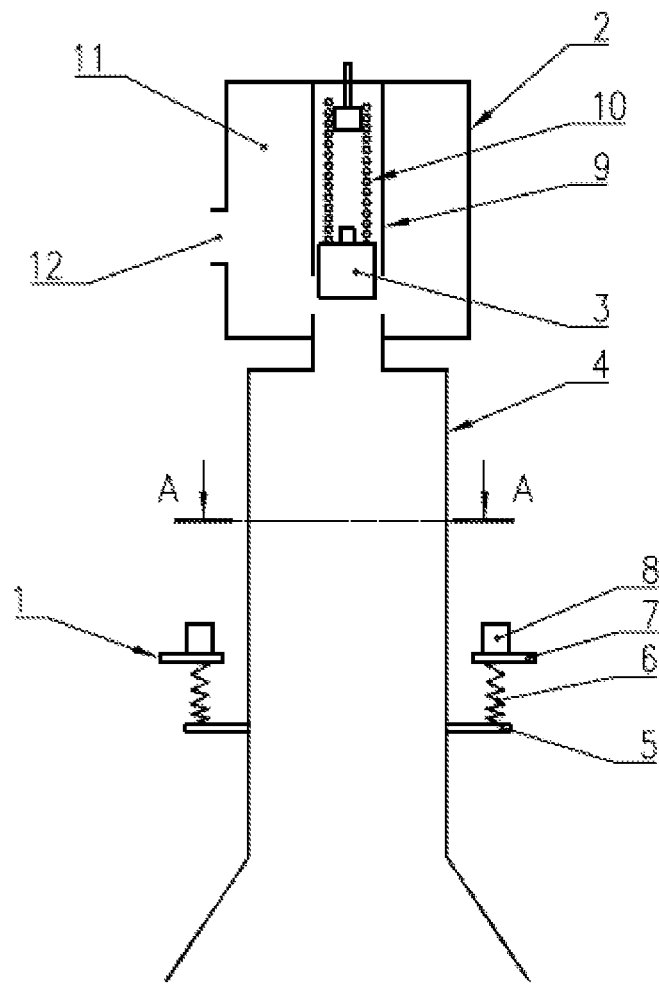
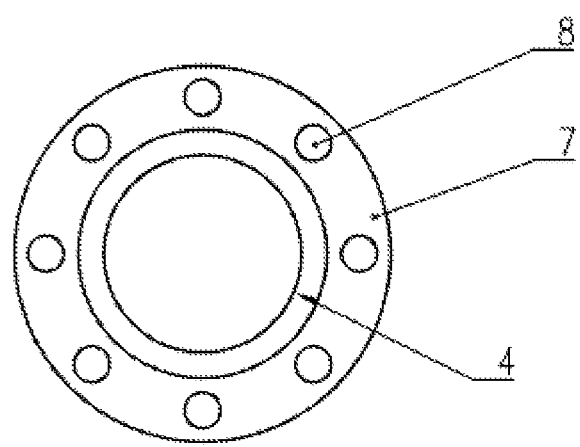

VIBRATION DAMPER FOR REDUCING VIBRATIONS OF A LOW FREQUENCY SOUND GENERATOR

THE FIELD OF THE INVENTION

The present invention refers to a vibration damper according to the pre-characterized portion of claim 1 and a low frequency sound generator according to the pre-characterized portion of claim 6 as well as the use of said vibration damper for preventing vibrations of the low frequency sound generator.

BACKGROUND OF THE INVENTION AND PRIOR ART

The present invention relates to a low frequency sound generator comprising a feeder unit and a quarter wave resonator tube, particularly an air-driven low frequency sound generator with a positive feedback system of the type described in U.S. Pat. No. 5,005,511. The feeder unit is connected to a compressed air system. A low frequency sound is generated by air pulses fed by the feeder unit into the resonator tube The dimensions of the resonator tube are chosen in such a way that a standing sound wave may be generated in the resonator tube by the compressed air supplied via the feeder unit. Preferably, the resonator tube is a quarter wave resonator tube. When a standing sound wave has been generated in the resonator tube, this standing sound wave has its maximum sound pressure amplitude at the rear end where the feeder unit is positioned.

The rear end of the resonator tube is exposed to the maximum sound pressure, resulting in a force acting on the rear end of the resonator tube. That force varies between a positive maximum value and a negative minimum value. The frequency of that variation is equal to the frequency of the standing sound wave in the resonator tube. The maximum positive value of the force can be up to 8 000 N or even, at some cases, higher.

The variation of the force acting at the rear end of the resonator tube of the low frequency sound generator causes an acceleration of the low frequency sound generator which also varies in phase with the sound pressure and having the same frequency as the frequency of the sound pressure.

The acceleration results in a movement of the low frequency sound generator. The maximum movement velocity amplitude depends on the acoustic power output of the low frequency sound generator, the mass of the low frequency sound generator and the way of suspension of the low frequency sound generator. At big powerful low frequency sound generators that movement can have a velocity amplitude of up to 100 mm/s or even more.

Low frequency sound generators of this type are, for example, used for cleaning of big boilers and for enhancing combustion in big furnaces.

The low frequency sound generator is fitted to the outer wall of the boiler or furnace. A movement of the low frequency sound generator can cause vibrations of the boiler or furnace, structure-borne noise of the boiler or furnace and other equipment connected to the boiler or furnace and/or air borne noise at the surroundings of the low frequency sound generator and the boiler or furnace.

Vibrations caused by low frequency sound generators have been an ever increasing problem as the acoustic power output of the low frequency sound generators have continuously increased over the years. So far two different technical solutions have been used to overcome the problems.

One technical solution is to make a very stiff connection between the resonator tube of the low frequency sound generator and the wall, where the low frequency sound generator is fitted.

The other technical solution is to fit ballast weights to the resonator tube, hence increasing the mass of the low frequency sound generator and the total vibrating system.

At low frequency sound generators having high acoustic power output none of above mentioned technical solutions works well.

There is a need for a device that prevents low frequency sound generators to vibrate. Preferably, the new device should not substantially increase the weight of the low frequency sound generator. There is a need for a device that can be easily installed on existing low frequency sound generators.

SUMMARY OF THE INVENTION

The object of the present invention is to provide a vibration damper and a low frequency sound generator that overcomes the problems mentioned above.

The object is achieved by a vibration damper defined in claim 1. The vibration damper is configured to be provided on a low frequency sound generator and configured to be positioned outside the resonator tube. The vibration damper comprises a first flange attached to the resonator tube, a number of springs, a second flange and a number of weights.

The vibration damper of the present invention is characterized in that the second flange is free to move in relation to the first flange.

The vibration damper can be installed on existing low frequency sound generators in an easy and cost effective manner.

Weights with different masses can easily be fitted to the second flange.

In one embodiment, the mass of the weights and of the second flange versus the spring constant of the springs are determined in such a way that, when the low frequency sound generator vibrates, the vibration velocity amplitude of the second flange is higher than the vibration velocity amplitude of the first flange.

Theoretically the object can be achieved by a vibration damper having only three springs, but that would require springs having very high spring constant, which are difficult to handle.

In another embodiment the numbers of springs is six or more.

It is important that the vibration damper is not too heavy in relation to the weight of the low frequency sound generator.

In one embodiment the mass of the weights and the second flange is lower than 20% of the total weight of the low frequency sound generator.

Furthermore, the object is achieved by a low frequency sound generator initially defined and characterized in that the low frequency sound generator further comprises a vibration damper configured to be positioned outside the resonator tube, which comprises a first flange connected to the resonator tube, a number of springs, a second flange and a number of weights.

In one embodiment of the low frequency generator, the total mass of the weights and of the second flange versus the spring constant of the springs are determined in such a way that, when the low frequency sound generator vibrates, the vibration velocity amplitude of the second flange is higher than the vibration velocity amplitude of the first flange.

In another embodiment of the low frequency sound generator the numbers of springs is six or more.

In a further embodiment of the low frequency sound generator the mass of the weights and the second flange is lower than 20% of the total weight of the low frequency sound generator.

The object is also achieved by a use of the low frequency sound generator according to any of the claims 6 to 9 for cleaning of a boiler or a heat exchanger.

The advantages of the low frequency sound generator, as well as the preferred embodiments thereof, are apparent from the discussions above with reference to the vibration damper.

BRIEF DESCRIPTION OF THE DRAWING

The present description is now to be explained more closely by means of embodiments, which are disclosed as examples, and with reference to the attached drawing.

FIG. 1 shows schematically a vibration damper.

DETAILED DESCRIPTION OF VARIOUS EMBODIMENTS OF THE INVENTION

FIG. 1 shows a feeder unit 2 of a low frequency sound generator mounted on a resonator tube 4. The resonator tube may be a quarter wave resonator tube 4. The feeder unit 2 comprises a piston 3 that is arranged to perform a reciprocating movement inside a cylinder 9. The piston 3 is spring-loaded by means of a spring 10, which is attached to the closed end of the cylinder 9. The cylinder 9 and the piston 3 are mounted in a surge tank 11. A compressed air supply system 12 is connected to the surge tank 11.

The feeder unit 2 feeds air pulses into the resonator tube 4. The dimensions of the resonator tube 4 are chosen in such a way that a standing sound wave may be generated in the resonator tube 4 by said air pulses. Further details regarding the low frequency sound generator are described in U.S. Pat. No. 5,005,511, which is hereby included in its entirely by reference.

FIG. 1 shows also a vibration damper 1 according to the present invention. The vibration damper 1 is configured to be positioned outside the resonator tube 4 on a low frequency sound generator as described above.

The vibration damper 1 comprises a first flange 5 attached to the resonance tube 4, a number of springs 6 attached to the first flange 5, a second flange 7 attached to said springs 6 and a number of weights 8 attached to said second flange 7.

The second flange 7 is only attached to the springs 6. Thereby the second flange 7 can move in relation to the first flange 5. The frequency of the movement of the second flange 7, the vibration velocity amplitude of the movement of the second flange 7 in relation to the movement of the first flange 5 and the phase difference of the movement of the second flange 7 in relation to the movement of the first flange 5 depends on the frequency of the vibration velocity amplitude of the first flange 5, the spring constant of the springs 6 and the total mass of the weights 8 and the second flange 7.

The vibration velocity amplitude of the movement of the first flange 5, and thereby the resonator tube 4, is lower the more the second flange 7 moves in relation to the first flange 5. That means that the vibration damper 1 may reduce the harmonic movement of the resonator tube 4 and hence of the total low frequency sound generator.

The vibration velocity amplitude movement of the second flange 7 can be increased by selecting the masses of the weights 8 and the second flange 7 versus the spring constant of the springs 6. That also means that the vibration velocity amplitude of the entire low frequency sound generator can be reduced by selecting the masses of the weights 8 and the second flange 7 versus the spring constant of the springs 6.

The force acting on each of the springs 6 is lower if the number of springs 6 is higher. Practical tests have showed that minimum six springs 6 are needed.

The reduction of vibration velocity amplitude of the first flange 5 is higher at higher total mass of the weights 8 and the second flange 7. Practical tests have shown that it is possible to reduce the vibration velocity amplitude of the first flange 5 by up to 80% or even more at a total mass of the weights 8 and the second flange 7 of less than 20% of the mass of the entire low frequency sound generator by correct selection of the mass of the weights 8 and the second flange 7 versus the spring constant of the springs 6.

The expression "low frequency sound" as used herein is meant to include sound of a frequency below approximately 38 Hz. A suitable operation frequency would be between approximately 15 and 30 Hz.

The expression "vibration velocity amplitude" as used herein is the peak value of the velocity of a harmonic back and forth movement of a solid component.

The present invention is not limited to the embodiments disclosed but may be varied and modified within the scope of the following claims.

The invention claimed is:

1. A vibration damper (1) configured to be provided on an air-driven low frequency sound generator, which comprises a feeder unit (2) with a positive feedback system regulated by a reciprocating spring loaded piston (3) and a resonator tube (4), whereby the vibration damper (1) is configured to be positioned outside the resonator tube (4), and comprises a first flange (5) connected to the resonator tube (4), a number of springs (6), a second flange (7) and a number of weights (8)

characterized in that the second flange (7) is free to move in relation to the first flange (5).

2. The vibration damper (1) according to claim 1, whereby a total mass of the weights (8) and of the second flange (7) versus a spring constant of the springs (6) are determined in such a way that, when the low frequency sound generator vibrates, the vibration velocity amplitude of the second flange (7) is higher than the vibration velocity amplitude of the first flange (5).

3. The vibration damper (1) according to claim 1, whereby the number of springs (6) is six or more.

4. The vibration damper (1) according to claim 1, whereby the mass of the weights (8) and the second flange (7) is lower than 20% of the total weight of the low frequency sound generator.

5. Use of a vibration damper (1) according to claim 1 for damping of vibrations of a low frequency sound generator.

6. A low frequency sound generator which comprises a compressed air supply system (12), a feeder unit (2) and a resonator tube (4), characterized in that the low frequency sound generator further comprises a vibration damper (1) configured to be positioned outside the resonator tube (4) and comprises a first flange (5) connected to the resonator tube (4), a number of springs (6), a second flange (7) and a number of weights (8).

7. The low frequency sound generator according to claim 6, whereby a total mass of the weights (8) and of the second flange (7) versus a spring constant of the springs (6) are determined in such a way that, when the low frequency sound generator vibrates, the vibration velocity amplitude of the second flange (7) is higher than the vibration velocity amplitude of the first flange (5).

8. The low frequency sound generator according to claim 6, whereby the number of springs (6) is six or more.

9. The low frequency sound generator according to claim 6, whereby the mass of the weights (8) and the second flange (7) is lower than 20% of the total weight of the low frequency sound generator.

10. A method of using the low frequency sound generator according to claim 6, the method of using comprising cleaning of a boiler or a heat exchanger.

\* \* \* \* \*